United States Patent
Jorn

[11] 3,730,509
[45] May 1, 1973

[54] COMPOSITE SPRING ELEMENT FOR USE AS A MOTOR MOUNT

[76] Inventor: Raoul Jorn, Post Wasserburg a.B., Hengnau, Germany

[22] Filed: Apr. 12, 1971

[21] Appl. No.: 132,981

[52] U.S. Cl. .................................267/152, 267/63
[51] Int. Cl. ..............................................F16f 3/10
[58] Field of Search.....................267/57.1, 63, 152

[56] References Cited

UNITED STATES PATENTS 3,211,491   10/1965   Browne et al. ..........................267/63
3,544,176   12/1970   Slater ....................................267/152

Primary Examiner—James B. Marbert
Attorney—Karl F. Ross

[57] ABSTRACT

A spring element includes a plurality of flat leaf springs which are parallel to each other and have a supported side and a deflectable load-engaging side, and a body of elastomeric material between the springs and bonded to at least one of them while being at least engageable with the other spring after some deflection of the element. The spring element can be elongated and bolted at one end to the load and at the other end to the support so that the springs, which are of some very rigid material such as steel, serve to support the load and the elastomeric body damps vibration. The springs can be bolted at one end and can also be of differing lengths, with the longest spring formed at its free end with an eye adapted to receive a bolt or pin on a load. The springs can also be annular with a plurality of inwardly extending tabs bent away from the plane of the outer periphery. The elastomeric body is a soft rubber or rubber mixture capable of withstanding heat and resistant to destruction by oil. Use of these elements for supporting an internal-combustion engine on a motor-vehicle frame is envisaged.

14 Claims, 27 Drawing Figures

PATENTED MAY 1 1973
3,730,509
SHEET 1 OF 3
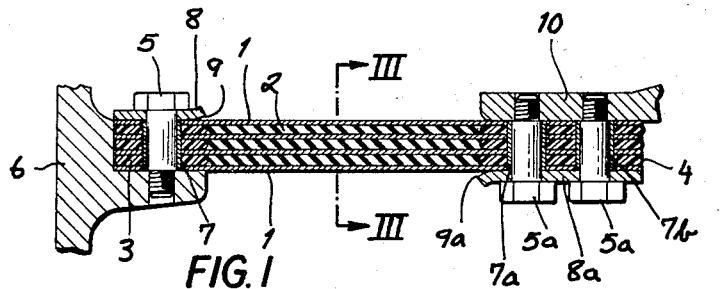
FIG. I
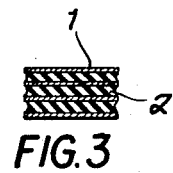
FIG. 3
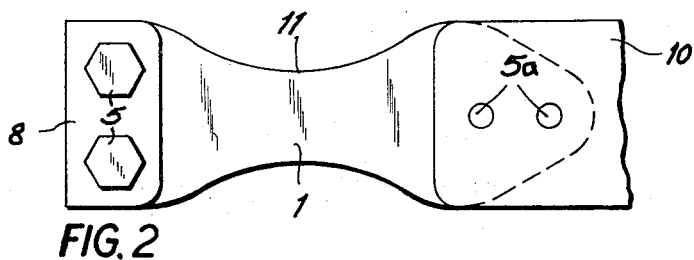
FIG. 2
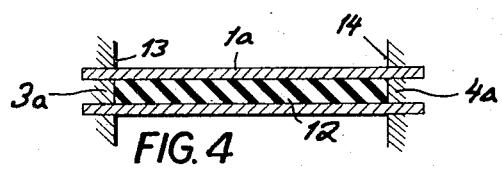
FIG. 4
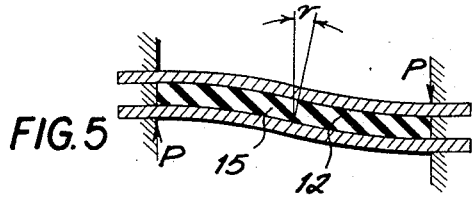
FIG. 5
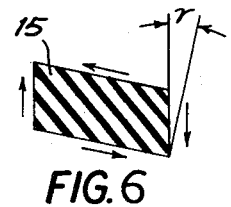
FIG. 6
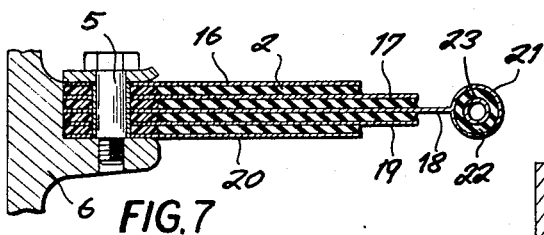
FIG. 7
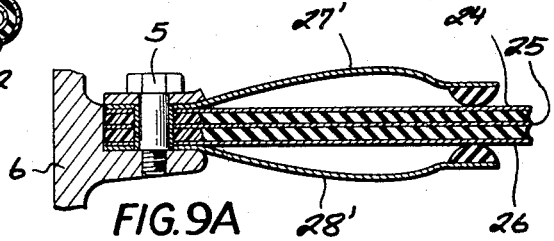
FIG. 9A
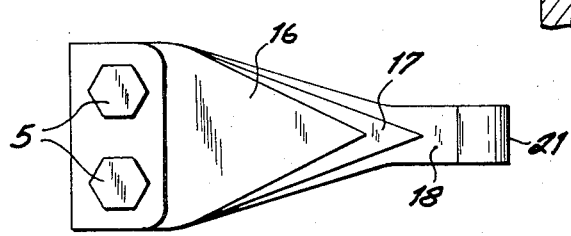
FIG. 8
Raoul Jörn
INVENTOR.
BY
Karl F. Ross
Attorney

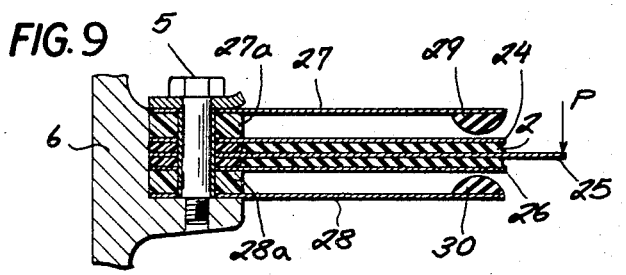
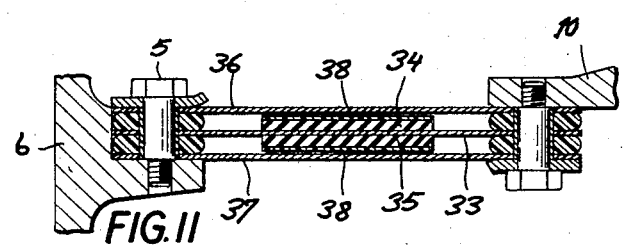
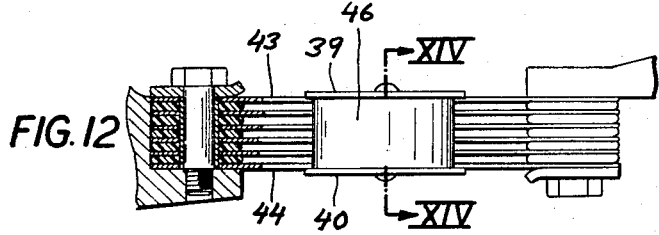
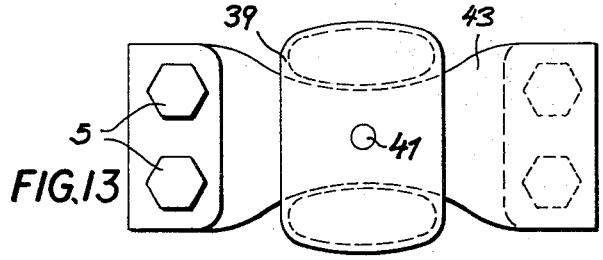
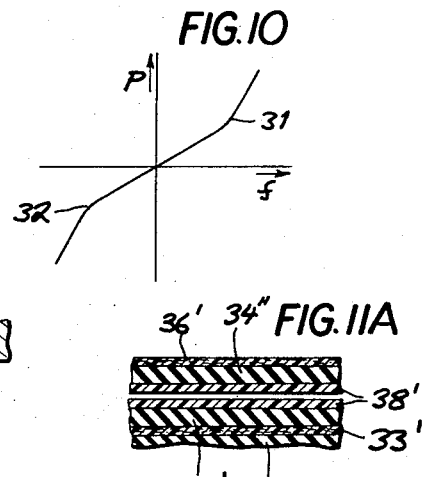
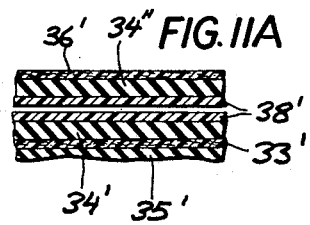
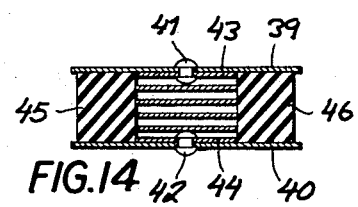
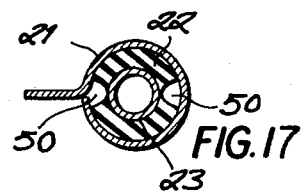
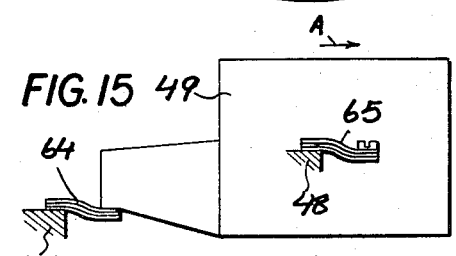
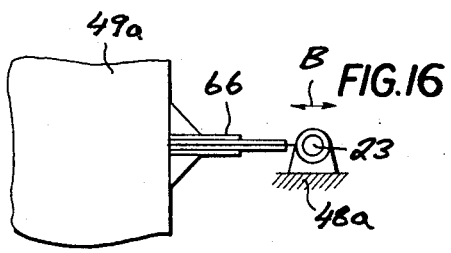
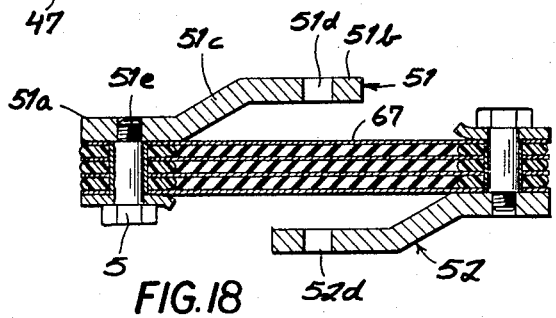
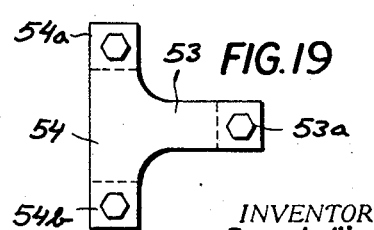
INVENTOR:
Raoul Jörn
BY
Karl F. Ross
Attorney

COMPOSITE SPRING ELEMENT FOR USE AS A MOTOR MOUNT

FIELD OF THE INVENTION

The present invention relates to a spring element. More particularly this invention concerns a spring usable in an engine mount for a motor vehicle.

BACKGROUND OF THE INVENTION

The elastic suspension of the engine of a motor vehicle is usually accomplished by a metal-rubber-metal sandwich that is interposed between lugs on the engine and lugs on the frame. This element should permit vertical displacement of the engine to a limited extent while greatly limiting horizontal movement.

Such motor mounts are often destroyed by heat, gasoline, or oil after a relatively short period, and their replacement is an arduous task at best, requiring for example jacking up of the engine to free the old mounts. In addition it is very difficult to make the mounts soft for vertically effective forces while very stiff for horizontally effective forces, so that an unsatisfactory compromise must be accepted.

It is nonetheless necessary to use highly elastic elastomers for such motor mounts since one of their principal tasks is to reduce noise transmission from the engine to the passanger compartment. Such highly elastic materials, however, have very little damping effect so that the engine can shake periodically, with vibration continuing well after the original cause is removed. The vibrations take an overly long time to decay, but when harder mounts are used excessive amounts of noise are conducted and the engine is subjected to severe shocks when, for instance, the vehicle hits a bump.

It has been suggested to use coil or leaf springs to support a motor, but this has been found to be even worse than the conventional rubber or caoutchouc motor mounts. Steel springs transmit high-frequency (sound) vibrations excessively well, and they have been hitherto too vibration-prone for use whever some damping is needed.

OBJECTS OF THE INVENTION

It is therefore an object of the present invention to provide an improved spring element.

Another object is the provision of a resilient motor mount which can withstand temperatures up to around 80° Centigrade and is not adversely affected by oil and gasoline.

Another object is to provide a spring with controlled damping and spring rate which, upon use in a motor mount shifts the resonance frequency of the system from the normal operating range of the motor.

Yet another object is the provision of such a motor mount which provides a highly elastic support for the engine while being heavily damped against oscillation and transmission of sound.

A further object is the provision of a motor mount of very small size and great bearing capacity.

SUMMARY OF THE INVENTION

I attain the above objects according to features of the present invention with a composite spring comprising a plurality of parallel leaf springs separated by bodies of an elastomeric material such as natural rubber or a rubber composition resistant to chemicals. The elastomeric bodies can be bonded on both sides between two springs, or can be only bonded to one of them but engageable with the other on deflection of the spring element.

The steel or fiberglas-reinforced synthetic-resin leaf springs are virtually insensitive to chemicals and temperature changes so that the spring element of this invention will not take a set after some use. The insignificant internal damping of the stiff leaf springs, which has made them unsuitable for some purposes is supplemented by excellent damping characteristics (analogous to viscous damping) of the elastomeric body which itself is not of the highly elastic, vibration-prone type so that the best characteristics of both types of springs are combined.

The spring element according to the present invention has a supported side and a load-engaging side, the latter being deflectable relative to the former. In this manner the bending of the leaf springs is effective on the elastomeric bodies as shear and compression. Due to the fact that most conventional elastomers have a modulus of elasticity which is many thousands of times smaller than most leaf springs, the elastomer has virtually no effect on the supporting capacity of the spring element, but it is effective to prevent oscillation of this element as well as transmission of sound through it.

The elastomeric material also holds the leaf springs apart and parallel to each other, preventing damaging deformation of the springs and making their effect cumulative, unlike a laminated spring. Proper selection of elastomer and leaf springs can allow construction of a spring element according to the present invention having virtually any desirable characteristic.

According to another feature of the invention the ends of the leaf springs are held apart at at least one of their ends by spacers which are stiffer than the elastomeric separating bodies and which can have a thickness slightly smaller than that of these bodies so that clamping the spring end prestresses the elastomer. These spacers can be of synthetic-resin material or metal. Ideally, the elastomeric bodies should have a thickness, even if precompressed, equal to two to three times the thickness of the uniform thickness leaf springs.

The elastomeric bodies can be vulcanized directly onto the springs. Alternately they may be simply compressed between these springs, or bonded to one and defining a slight gap with another spring or with another spring-mounted body. In any case it is important that on deflection of the spring element enough friction exists between the two faces of the elastomeric body to produce shear and compression stresses therein.

In accordance with another feature of the present invention one of the leaf springs is bonded or adhesively connected, on its face turned towards another such spring, with a highly elastic elastomeric strip coated with a synthetic-resin friction surface which defines a narrow gap with the other spring. On bending deflection of the spring this friction surface will come into contact with the other spring and create shear and compressive stresses in the highly elastic elastomeric body. If the bending is extreme the shear and compressive stresses will exceed the friction forces and the surface will slide on the other spring. This action makes for a very effective damping of any large force since the elastomeric body, having lost much of the stored energy as shear and compression, will not spring back to an extent equal to the amount it was originally displaced. At the same time slight bending is accepted elastically by the spring element.

The spring element of this invention has a natural resonance frequency which is so low that it lies below the standard operating frequency of the engine. At the same time its damping eliminates potentially dangerous membrane vibration of the leaf springs.

DESCRIPTION OF THE DRAWING

The above and other objects, features, and advantages will become apparent from the following description, reference being made to the accompanying drawing in which:

FIG. 1 is a longitudinal section through a first embodiment of the present invention;

FIG. 2 is a top view of the first embodiment;

FIG. 3 is a section taken along line III—III of FIG. 1;

FIGS. 4 and 5 are longitudinal sections through a generic embodiment of the present invention illustrating its principles of operation;

FIG. 6 is a detail of FIG. 5 in enlarged scale;

FIGS. 7 and 8 are respectively a longitudinal section and a top view of a second embodiment of the present invention;

FIG. 9 is a longitudinal section through a third embodiment of the present invention;

FIG. 9A is a detail view showing a fourth embodiment of this invention;

FIG. 10 is a graph illustrating characteristics of the third embodiment;

FIG. 11 is a longitudinal section through a fifth embodiment of the present invention;

FIG. 11A is a detail view in enlarged scale through a sixth embodiment of the present invention;

FIGS. 12 and 13 are respectively a longitudinal section and a top view of a seventh embodiment of the present invention;

FIG. 14 is a section taken along line XIV—XIV of FIG. 12;

FIGS. 15 and 16 are views illustrating the use of the spring element of the present invention;

FIG. 17 is a detail of a eighth embodiment of the invention;

FIG. 18 is a longitudinal section through an ninth embodiment of the present invention;

FIG. 19 is a top view of a tenth embodiment of the present invention;

SPECIFIC DESCRIPTION

Figure 20:
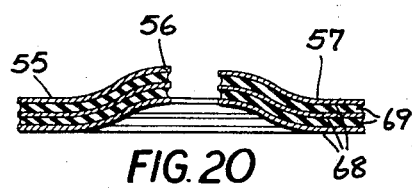
FIGS. 20 and 21 are respectively sectional and top views of a eleventh embodiment of the present invention.

There is shown in FIGS. 1 – 3 a spring element comprising a plurality of very thin leaf springs 1 which extend parallel to each other between a lug 6 on a support and a lug 10 on a load. These springs 1 are made of spring steel with a plurality of strips 2 of rubber mixture vulcanized between them. These strips 2 extend fully between the support 6 and load 10 and are bonded to the springs 1 along their full length. At the load-engaging end of the springs 1 there are provided a plurality of spacers 4 which are of relatively hard synthetic resin and have a thickness only slightly inferior to that of the body 2 of elastomer between the springs 1 in fully relaxed condition. In this manner when bolts 5a inserted through slightly resilient bushings 7a, 7b clamp this end of the element against the load 10 a slight amount of precompression is imparted to the bodies 2. Similar bolts 5, bushings 7 and spacers 3 serve to secure the supported end of the element, with a metal body 8 having an upturned edge 9 secured under the bolt head for most play-free fastening of the spring element. A similar plate 8a with a lip 9a is provided under the head of the bolts 5a. The precompressed bodies 2 have a thickness equal to two or three times the thickness of the springs 1, which are of constant thickness but of reduced width at the center as shown at 11.

FIGS. 4 – 6, 13 and 14 represent the support and the load, with leaf springs 1a separated by an elastomeric strip 12. Spacers 3a and 4a are provided similar to the spacers 3 and 4 of FIG. 1. A pair of equal and oppositely directed forces P are effective on the ends of the spring element to deflect the load 14 down relative to the support 13 and thereby distort the center of the element through an angle γ (see FIGS. 5 and 6). It is apparent that a portion 15 of the body 12 which was originally rectangular is distorted into a parallelogrammatic shape on deflecting of the element, thereby subjecting this portion 15 to shear and compression. The springs 1a are subjected principally to simple bending since their length is a multiple of their thickness. In this embodiment with steel springs having a modulus of elasticity of around 800,000 kp/cm$^2$, and an elastomer with a modulus of around 10 kp/cm$^2$ the body 12 serves neither to support the load nor to restore it to its rest position; it serves only to damp vibrations in the spring element. This spring element does not act as a simple laminated spring since the separate springs do not contact each other, their spacing being maintained by the body 12. An elastomer is used which would impart a resonance or oscillation frequency to the element which is so far different from the resonance or oscillation frequency of the leaf springs that the two tend to cancel each other out. It should be clear that, were there to be no body between the leaf springs, these would after deflection vibrate back and forth at very high speed whereas if only the elastomeric body were provided it would tend to vibrate at a much lower speed for a much shorter period.

FIGS. 7 and 8 show an embodiment of the spring element wherein five leaf springs 16 – 20 are enchored by a bolt 5 to a support 6. These elements are generally triangular with the center element 18 formed at its end remote from the support 6 with an eye 21 receiving an elastic synthetic-resin bushing 22 in turn receiving a metallic bushing 23 adapted to receive a horizontal bolt or pin on a load. The springs 17 and 19 are of the same length and are shorter than the spring 18, and the springs 16 and 20 are correspondingly shorter than the springs 17 and 19. The spaces between these springs 16 − 20 are filled completely with elastomeric material 2 which is vulcanized in place.

In FIG. 9 three springs 24 − 26, the center of which is longer than the two others as in FIGS. 7 and 8, are separated by elastomeric material 2 and mounted to a support 6 as in the above-described Figures. In this embodiment however two additional springs 27 and 28 are provided which flank the springs 24 − 26 and are of the same length as the springs 26 and 27. These springs 24 − 28 are all parallel but the spacing between the springs 27 and 28 and their neighboring spring 24 or 26, respectively, is greater than the spacing between the springs 24 − 26. To this end extra-wide spacers 27a and 28a are provided under the bolt 5. The springs 27 and 28 carry on their free ends inwardly directed respective bumpers 29 and 30 made of rubber or synthetic-resin material.

The structure shown in FIG. 9A is identical to that of FIG. 9 except that the spacers 27a and 28a are eliminated and prestressed overload springs 27' and 28' are provided. Such an element is advantageous because adjustment of its load capacity can be made by changing the overload elements.

This type of spring is extremely useful in a motor useful in a motor vehicle as the engine support since it permits slight movement with very light resistance since only the prings 24 − 26 will be effective. This is shown in FIG. 10 as the line between deflection points 31 and 32. However, if a pressure P is exerted in either direction on the spring to bring about a deflection f beyond the points 31 or 32 the characteristic of the spring element changes, it becomes stiffer since one of the elements 27 or 28 is added to it. This is extremely advantageous in a motor vehicle since some movement of the engine must be permitted to damp sound and allow its correct functioning, but the motor must be prevented from moving too far when the vehicle strikes a bump or the like.

It is also worth noting that the bumpers 29 and 30 are intended to frictionally engage their respective springs 24 and 26 so that these bumpers 29 and 30 serve much as the body of elastomeric material 2. It is not strictly necessary that the body 2 be bonded on both sides, nor that it always be engaged between two springs since it is only intended to damp vibration and therefore need only engage both elements when they are deflected. Frictional engagement at least is necessary to create the shear stress in the elastic bumpers 29 and 30 necessary to damp vibrations. It is also possible to dimension the springs 27 and 28 much stiffer than the other springs 24 − 26 so as to make a very sharp transition at the deflection points 31 and 32 shown in the graph of FIG. 10.

FIG. 11 shows an embodiment wherein three parallel leaf springs 33 − 35 are anchored as in FIG. 1. The center spring 33 is bonded at its central region on each face to a pair of synthetic-rubber elastomeric bodies 34 and 35 which are in turn each covered with a synthetic-resin friction coating 38 that defines a gap of regular width with the springs 36 and 37. This uses the principle described above with reference to FIG. 9. So long as the amount of movement of the load 10 relative to the support 6 is nominal the friction faces 38 remain out of contact with their confronting springs 36 and 37.

When the load 10 is deflected beyond a predetermined limit, however, this covering 38 comes to bear on its respective spring and creates shear stress in the associated elastomeric body 34 or 35 to cause the damping effect described above.

FIG. 11A shows how a Fiberglas-reinforced synthetic-resin upper spring 36' can also be provided with an elastomeric body 34'' which has its own friction coating 38' engageable with a similar coating 38' on a similar body 34' bonded to the central spring 33'. In this embodiment the two surfaces 38' contact each other on deflection of the load-engaging end of the spring element.

The arrangement shown in FIGS. 12 − 14 is essentially identical to that of FIG. 1 except that no elastomeric mass is provided between the individual leaf springs. Instead, the outer springs 43 and 44 are connected by rivets 41 and 42 to a pair of plates 39 and 40 which project laterally. Molded between the projecting edges of these plates 39 and 40 are a pair of masses 45 and 46 of elastomeric material which serve to damp vibration. The rivets 41 and 42 are in line with each other at the very middle of the springs 43 and 44 so that they lie at the points of greatest relative displacement of these two springs, and therefore have the greatest damping efficiency. These plates 39 and 40 can be considered to constitute a part of the outer springs 43 and 44.

FIG. 15 shows a motor-vehicle engine 49 attached at its rear end below its transmission to the motor-vehicle frame at 47 by an axially (relative to the motor-vehicle direction of travel shown by arrow A) extending spring element 64 which can be of any of the types described above. A pair of similarly axially extending springs 65 (one only shown) support the motor laterally on the frame 48. Such an arrangement allows the engine 49 to roll, or turn about its axis while preventing possibly dangerous axial displacement.

In FIG. 16 the view is taken in the direction of travel and double-headed arrow B is horizontal and perpendicular to the direction of travel. Thus, a motor-vehicle engine 49a in connected via a horizontal spring element 66 having an eye 23, as shown in FIGS. 7 and 8, extends in the direction of the arrow B and supports the motor on the vehicle frame at 48a. This element 66 takes the place of the element 65 of FIG. 15 and serves to prevent lateral displacement of the engine 49a. A slight amount of lateral movement as well as the normal creep of the spring element 66 during flexing is taken up by axially extending notches 50 cut in the resilient bushing 22 as shown in FIG. 17. The engine naturally produces a torque about its longitudinal axis when accelerating, and is subjected to torsion when the vehicle is slowed down. To this end it must be able to turn to a limited extent about the direction of travel. It also must be protected from shocks up and down as the vehicle hits bumps and holes, thus it must be movable in the vertical direction. Finally, it should not be displaceable either forward or backward or to the side relative to the vehicle, since the drive train would suffer. The spring elements 64, 65 and 66 are arranged to that they only allow vertical displacement, and that to a limited extent, and twisting about the direction of travel. These elements are neither extensible nor shortenable, longitudinally they are extremely strong, so that the virtually no horizontal displacement relative to the vehicle frame is possible.

FIG. 18 shows an element 67 essentially identical to that of FIGS. 1 – 3, but which is provided with mounting brackets 51 and 52 of identical shape. Bracket 51 has a pair of parallel but offset legs 51a and 51b interconnected by a diagonal portion 51c. The leg 51a is formed with a threaded bore 51e which receives the end of the bolt 5 and the leg 51b is formed with a bore 51d allowing bolting of this leg to a load. The bracket 52 is formed with a similar bore 52d which is in line with the bore 51d. This element 67 can either be used to support a load from underneath or to hang a load, in both cases it functions as described with reference to the other embodiments. It can be used to replace a conventional rubber motor mount.

In FIG. 19 an element 53 is shown which is T-shaped with its two T-arms 54a and 54b adapted to be connected to a load or support, and the central T-leg 53a adapted to be bolted to the support or load, respectively. This element 53 is extremely useful in applications where limited spaced is available. It is acted upon by torsion at the location shown at 54 and can be made very effective compared to a conventional spring of similar size.

Figure 21:
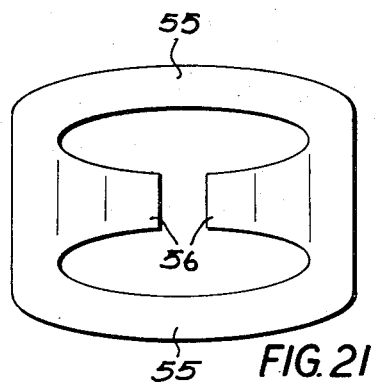

In FIGS. 20 and 21 there is shown a spring element according to the present invention wherein the one (supported or load-engaging) side is constituted by an annular body, and the other side (load-engaging or supported, respectively) is embodied as a pair of inwardly and upwardly extending tabs 56. This element is formed of three identical spring steel sheets 68 formed and cut as described above, with a pair of identically shaped rubber bodies 69 bonded between them. The annular portion 55 is somewhat elongate with rounded sides and square ends.

Figure 22:
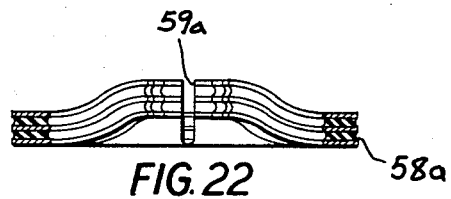
FIGS. 22 and 23 are respectively sectional and top views of a twelfth embodiment of the present invention.
Figure 23:
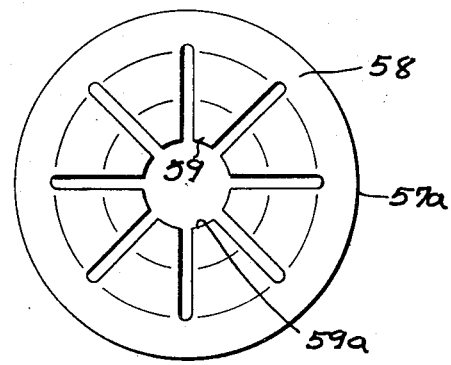

In FIGS. 22 and 23 a circular spring element is shown which has a circular outer annular periphery 58a and a plurality of inwardly directed circle-segment tabs 59 which form a circular inner periphery 59a. The tabs 59 are bent up so that the inner periphery 59a lies in a plane parallel to and spaced from that of the outer periphery. This element is constructed as a sandwich much like the embodiment of FIGS. 20 and 21. In both embodiments the element is adapted to replace a spring of the belleville washer type wherein great axial resistance to compression is needed. The present invention, however, eliminates one of the principal difficulties of a belleville washer in that it is damped. Such an element is used to advantage at the end of a motor-vehicle shock absorber to lengthen its service life. Of course the segment defining notches could be outwardly if desired to make a spider-like spring element.

Figure 24:
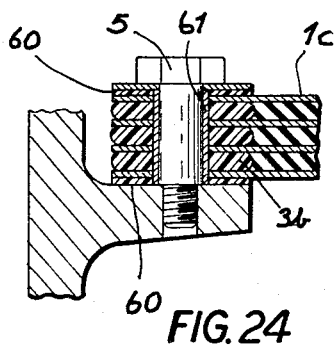
FIGS. 24 and 25 show different methods of anchoring the spring element of the present invention.

FIG. 24 shows a method of clamping an end of an element 1c, much like the element of FIGS. 1 – 3, with its spacers 3b by means of a bolt 5. A rubber sleeve 61 formed with upper and lower washers 60 is held by the bolt 5 and allows some pivoting of the element 1c about the axis of this bolt 5. The lower washer 60, as seen in the Figure, can be harder than the upper one. Pivoting of the element 1c in its own plane is often necessary, and this arrangement permits such movement without delay.

Figure 25:
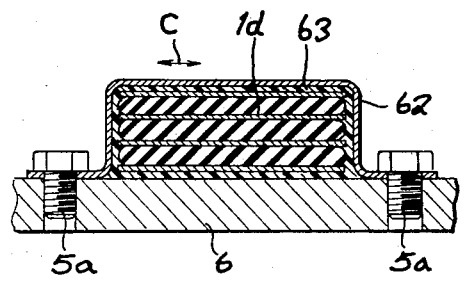

The arrangement of FIG. 25 shows a generally U-shaped bracket 62 having tabs secured to a support 6 by means of bolts 5a. A portion 1d of an elongated spring element according to this invention is clamped against the support by the bracket 62, with a narrow elastic rubber layer 63 completely surrounding it and permitting slight transverse movement of the portion 1d relative to the support 6 as shown by arrow C. Such a bracket 62 is applicable when an element such as shown in FIGS. 1 – 3 is connected at both ends to a support and a load is clamped to its center. Of course in that case some axial displacement of at least one of the ends would have to be possible and a pair of narrow portions 11 flanking the bracket 62 would be necessary such that, for instance, the load-engaging side would be the center and the supported side would be the ends.

Although the spring element of the present invention is described above mainly with reference to a motor mount for a vehicle, it is equally usable wherever a damped resilient spring is needed. Mounting of many types of machinery such as centrifuges, blowers, compressors, and the like, where vibration is a problem, is facilitated by the spring element of my present invention. It has also been found that my new spring is extremely useful as the mount for a tractor seat or motorcycle saddle which have hitherto been oscillation prone.

I claim:

1. A spring element comprising at least two codirectionally extending substantially parallel bendable but relatively incompressible spaced-apart leaf springs having a common supported side and a common deflectable load-engaging side; a rigid spacer received between said leaf springs at said supported side; means supporting said leaf springs and clamping said leaf springs against said spacer at said supported side; and a body of an elastomeric material of greater compressibility than said spacer bridging said springs and bonded to at least one of said springs and at least in frictional engagement with the other spring upon bending deflection of said element for damping vibration therein, said body of elastomeric material at least partly filling the space between said springs.

2. The element defined in claim 1 wherein said leaf springs are of substantially equal and uniform thickness, said body is thicker than said springs and separating same, and said element includes at least three such leaf springs and at least two such bodies received between respective pairs of said leaf springs, at least one such spacer being provided between the leaf springs of each pair, said spacers having a thickness corresponding to that of said body and being of greater rigidity than said body.

3. The element defined in claim 2 wherein both of said springs are elongate and one is longer than the other and formed at said load-engaging end with an eye.

4. The element defined in claim 3 wherein several such elements are used to support a motor-vehicle engine on a motor-vehicle frame, one of said elements extending parallel to the direction of travel and lying with reference to said direction behind said engine, a pair of said elements flanking said engine transversely to said direction.

5. The element defined in claim 2 wherein said leaf springs are elongate, said element including a foreshortened spring parallel to the two first-mentioned springs, said foreshortened spring having one end anchored at said supported side and another end carrying a bumper constituting one of said bodies and engageable with one of said springs after a predetermined amount of deflection thereof.

6. The element defined in claim 2 wherein said leaf springs are elongate and of reduced width at their center.

7. The element defined in claim 2 wherein said leaf springs are elongate and are fixed relative to each other at each end whereby said springs are subjected principally to bending and said body principally to shear and compression stress.

8. The element defined in claim 2 wherein said leaf springs are annular and have an outer peripheral region constituting one of said sides and an inner peripheral region constituting the other side.

9. The element defined in claim 8 wherein said element is formed with a plurality of radially extending notches opening inwardly at said inner peripheral region, said peripheral regions being generally circular and defining parallel spaced planes.

10. The element defined in claim 2 wherein said body is rubber and is vulcanized along one surface to said one of said springs.

11. The element defined in claim 2 wherein said body is vulcanized to both said springs.

12. The element defined in claim 2 wherein said body is spaced from said other spring in an undeflected position of the element, said body being provided with a friction layer confronting said other spring.

13. The element defined in claim 13 wherein said body is composed of relatively soft rubber and said layer is composed of a stiffer rubber.

14. The element defined in claim 2 wherein said springs are generally T-shaped and said body lies only within the shank of the T.

* * * * *

UNITED STATES PATENT OFFICE
CERTIFICATE OF CORRECTION

Patent No. 3,730,509        Dated 1 May 1973

Inventor(s) Raoul JÖRN

It is certified that error appears in the above-identified patent and that said Letters Patent are hereby corrected as shown below:

In the heading, before line "[52]" insert:

--[30] FOREIGN APPLICATION PRIORITY DATA    should read

-- April 15, 1970   Germany   P. 20 17 999.1 --.

Signed and sealed this 26th day of February 1974.

(SEAL)
Attest:

EDWARD M. FLETCHER, JR.        C. MARSHALL DANN
Attesting Officer                Commissioner of Patents